July 26, 1966  H. MAROLDT ETAL  3,262,530
ELECTROMAGNETIC FRICTION CLUTCH
Filed April 9, 1964
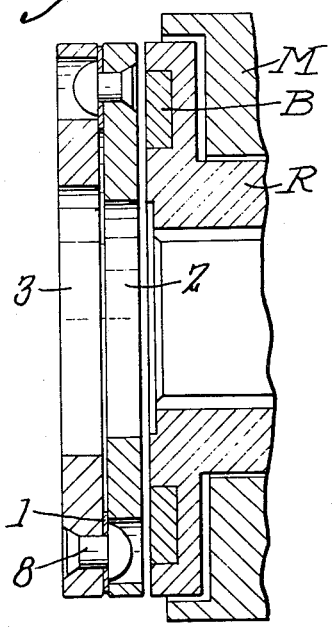
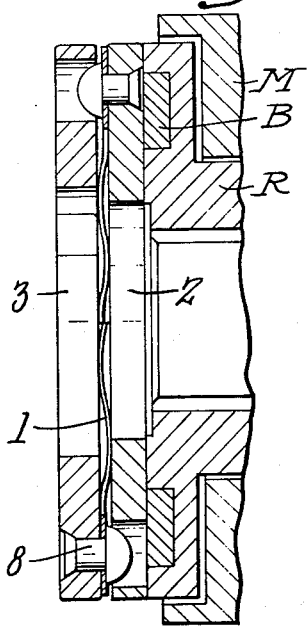
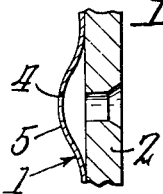
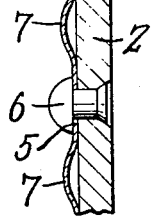
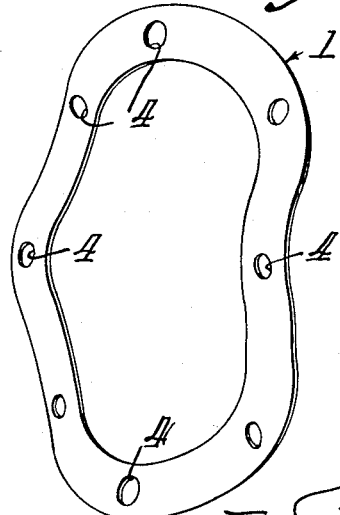

3,262,530
ELECTROMAGNETIC FRICTION CLUTCH
Heinz Maroldt, Hans-Joachim Egbers, and Walter Krome, Hameln, Germany, assignors to Hobbs Manufacturing Company, Worcester, Mass., a corporation of Massachusetts
Filed Apr. 9, 1964, Ser. No. 358,603
6 Claims. (Cl. 192—84)

This invention relates to an electromagnetic friction clutch which comprises an intermediate movable magnetic element attached by a spring to one member of the clutch and completely disconnected from the other member of the clutch, the clutch members being fixed against relative rectilinear motion; the spring having a sinusoidal configuration which is effective to retract the intermediate movable member away from the member to which it is not connected instantly upon the absence of the magnetic force, the action being very positive, avoiding chatter, gradual loosening of the parts, and residual movements as well as undue heating of the clutch as in the prior art.

The prior art includes electromagnetic clutches comprising a pair of magnetic clutch members which are themselves not movable and having interposed between them and movably connected to one member a movable anchor disc or the like which by the excitation of the magnet construction is attracted to the non-connected members for coupling the two clutch members. For connecting the intermediate magnetic anchor disc to one clutch half, flat springs, coil springs, and steel or plastic membranes have been used in the prior art. Flat springs require a suitable fastening and result in a rather ungainly construction. Membranes are disadvantageous because the two friction points are unequally loaded and especially with plastic membranes the operating temperature under the deformation must be kept low. Also on account of the easy deformability, changes in dimension are encountered in assembling and operating. In the use of coil springs there is always a disturbing play between the parts with a consequent chatter and noise, and the surfaces working upon each other must be lubricated, so that such constructions are not free from the need of servicing.

The use of the sinusoidally bent ring, of spring material, used in the present invention, avoids the disadvantages of the prior art constructions. The novel sinusoidally bent ring is connected at the vertexes of the sine curves under initial stress alternately with the movable anchor and the fixed part of the clutch half, and this provides advantages in the present invention which include the quickest possible action but at the same time the most positive action.

Other objects and advantages of the invention will appear hereinafter.

Reference is to be had to the accompanying drawings, in which:

FIG. 1 is a sectional view through the parts of the clutch showing the same disengaged;

FIG. 2 is a similar view showing the clutch engaged;

FIG. 3 is a perspective view of the sinusoidal spring in relaxed condition;

FIG. 4 illustrates the positioning of the spring with respect to the anchor prior to being fastened;

FIG. 5 is a view similar to FIG. 3 showing the parts fastened, and

FIG. 6 is an edge view illustrating a built-up spring.

The principal parts of the construction include a fixed ring-shaped magnet body indicated by the character M surrounding the pole ring or rotor R which is rotatably mounted and provided with an annular inserted friction surface B. The body M is fixed both rotationally and axially while the rotor R rotates, e.g., it may be fixed to the drive shaft. Both of these parts are axially fixed both with respect to each other and the remainder of the clutch.

The reference character 1 indicates the sinusoidal annular spring which is connected at one side to the magnetic anchor 2, and at its opposite side to the clutch part 3. As shown in FIG. 1, in the absence of magnetic excitation, the spring causes the anchor 2 to be drawn into substantial contact with the clutch part 3, the clutch part 3 being axially fixed but rotatable and fastened to a hub or the like (not shown) connected with the shaft to be driven. The clutch part 3 could be loosely mounted to rotate with respect to the shaft that carries the rotor R but directly connected to a machine part to be driven.

As shown in FIG. 2 when magnetic flux is present, the anchor disc 2 is attracted to the rotor R and couples the parts so that the clutch is operative.

The ring 1 is resilient and originally flat, and as shown in FIG. 3 it is bent in a sinusoidal manner having a plurality of vertexes extending alternately in opposite directions as viewed in FIGS. 1 and 2, and at these vertexes it is provided with fastening holes 4.

Referring now for instance to FIG. 4, there is shown a vertex 5 in the sinusoidal ring 1 and it has a fastening opening 4 through which is provided a rivet 6. When the rivet is in operative condition as shown in FIG. 5, the vertex 5 has been distorted and flattened down onto the anchor 2, leaving or maintaining the ring under stress as is perhaps shown in exaggerated form at 7, 7 in FIG. 5.

As shown at 8, similar rivets are provided for similarly fastening the alternate vertexes of the sinusoidal ring 1 to the clutch part 3, and because of this construction, the normal position of the parts is as shown in FIG. 1, the sinusoidal spring snugly holding the anchor 2 to the clutch part 3.

The sinusoidal spring 1 is so proportioned however that the anchor 2 under action of magnetism is axially movable to the right and becomes frictionally fixed with respect to the rotor R coupling the clutch. The motion is extremely small and is substantially instantaneous.

As contrasted with a flat spring having no stress as above described and which is stressed only by the attraction of the anchor by a magnet, and is relieved of stress substantially to zero by retraction of the anchor from the magnet, there is no assurance of retractive force. However by the present invention using the sinusoidally bent annular spring under the stresses described, the fully retracted anchor is still provided with a retractive force so that the anchor then lies against the clutch part 3 under spring tension and no opposite movement can occur except under the action of magnetism. Therefore chattering of the connected clutch parts is completely avoided. The deformations shown at 7 in FIG. 5 serve as a cushion and act to further suppress any noise which might be present with a flat spring such as in the prior art.

When large clutch units are to be used, several annular laminated rings can be used as shown in FIG. 6 at 9, or separate ring segments can be combined into one ring in case the width of commercially available spring steel is not great enough so that a complete ring can be stamped out.

The invention is of course also usable with electromagnetically actuated brakes as it is well known that every clutch is usable also as a brake.

Having thus described our invention and the advantages thereof, we do not wish to be limited to the details herein disclosed, otherwise than as set forth in the claims, but what we claim is:

1. A magnetically actuated friction clutch comprising a magnetic clutch part and a second cooperative clutch part, the latter including a magnetic member and a supporting member therefor, the supporting member and the first-named clutch part being arranged on an axis and being relatively rotatable thereabout but fixed against movement in an axial direction, and means mounting the magnetic member on its supporting member, said means comprising a spring member of permanent sinusoidal form having certain vertices thereof fixed to the supporting member and other vertices fixed to the magnetic member, the latter being located between the magnetic clutch part and the supporting member, the spring member normally maintaining the supporting member and its magnetic member in close association but yielding to provide a friction coupling of the magnetic member and the magnetic clutch part upon the presence of magnetic flux.

2. The magnetically actuated friction clutch of claim 1 including means fixing the vertices of the sinusoidal spring member extending away from the magnetic member to the same, thereby stressing the spring member at such vertices.

3. The magnetically actuated friction clutch of claim 1 including means fixing the vertices of the sinusoidal spring member extending toward the magnetic member to the supporting member, thereby stressing the spring member at such vertices.

4. The magnetically actuated friction clutch of claim 1 including means fixing the vertices of the sinusoidal spring member extending away from the magnetic member to the same, thereby stressing the spring member at such vertices, and means fixing the vertices of the sinusoidal spring member extending toward the magnetic member to the supporting member, thereby stressing such last-named vertices.

5. The magnetically actuated friction clutch of claim 1 wherein the spring is annular and the magnetic member is also and correspondingly annular.

6. The magnetically actuated friction clutch of claim 1 wherein the spring includes a plurality of superposed spring members.

References Cited by the Examiner

UNITED STATES PATENTS

| | | | |
|---|---|---|---|
| 1,765,670 | 6/1930 | Herr | 192—84 |
| 2,407,757 | 9/1946 | MacCallum | 192—84 |
| 2,751,056 | 6/1956 | Aumuller et al. | 192—84 |
| 2,953,227 | 9/1960 | Gilbert | 192—84 |
| 2,968,381 | 1/1961 | Vosler | 192—69 X |
| 3,092,307 | 6/1963 | Heidorn. | |
| 3,162,285 | 12/1964 | Sala | 192—84 |

DAVID J. WILLIAMOWSKY, *Primary Examiner.*

DON A. WAITE, *Examiner.*

A. T. McKEON, *Assistant Examiner.*